US010389819B2

(12) United States Patent
Sakabe

(10) Patent No.: US 10,389,819 B2
(45) Date of Patent: Aug. 20, 2019

(54) ELECTRONIC DEVICE AND NON-TRANSITORY COMPUTER-READABLE RECORDING MEDIUM STORING CONNECTION INFORMATION MANAGEMENT PROGRAM

(71) Applicant: KYOCERA Document Solutions Inc., Osaka (JP)

(72) Inventor: Keiji Sakabe, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 262 days.

(21) Appl. No.: 15/441,458

(22) Filed: Feb. 24, 2017

(65) Prior Publication Data

US 2017/0251061 A1 Aug. 31, 2017

(30) Foreign Application Priority Data

Feb. 29, 2016 (JP) ................................ 2016-036893

(51) Int. Cl.

*H04L 12/00* (2006.01)
*H04L 29/08* (2006.01)
*H04L 12/24* (2006.01)
*H04L 29/06* (2006.01)

(52) U.S. Cl.

CPC ............ *H04L 67/141* (2013.01); *H04L 67/34* (2013.01); *H04L 41/24* (2013.01); *H04L 63/0492* (2013.01); *H04L 67/104* (2013.01)

(58) Field of Classification Search

CPC . H04L 63/0492; H04L 67/141; H04L 67/104; H04L 41/24
USPC ................................ 709/204, 224, 223, 227
See application file for complete search history.

(56) References Cited

U.S. PATENT DOCUMENTS

| | | | | |
|---|---|---|---|---|
| 7,073,017 | B2 * | 7/2006 | Yamamoto | G06F 8/65 711/103 |
| 7,590,522 | B2 * | 9/2009 | Hansen | G06F 3/0626 703/24 |
| 7,822,894 | B2 * | 10/2010 | Harima | G06F 3/0605 709/224 |

(Continued)

FOREIGN PATENT DOCUMENTS

JP 2004-258870 A 9/2004

*Primary Examiner* — Frantz Coby
(74) *Attorney, Agent, or Firm* — IP Business Solutions, LLC

(57) ABSTRACT

An electronic device includes: a wireless communication section that executes P2P wireless communication; an FW update mode switching section that switches a mode of the electronic device to an FW update mode in which a firmware of the electronic device is updated; and a connection information management section that manages connection information required for a connection setup for the P2P wireless communication executed by the wireless communication section. The connection information management section keeps the connection information when a power source of the electronic device is turned on after turned off in a specific situation, and changes the connection information when the power source of the electronic device is turned on after turned off in a situation other than the specific situation, and the specific situation includes an FW update situation in which the mode of the electronic device is the FW update mode.

4 Claims, 7 Drawing Sheets

(56) References Cited

U.S. PATENT DOCUMENTS

| | | | | |
|---|---|---|---|---|
| 7,948,925 | B2 * | 5/2011 | Miyabayashi | H04L 63/0492 370/302 |
| 9,165,076 | B2 * | 10/2015 | Gomez | G06F 16/152 |
| 9,451,023 | B2 * | 9/2016 | Sancheti | G06F 3/065 |
| 10,149,335 | B2 * | 12/2018 | Gujral | H04W 4/70 |
| 2006/0173980 | A1 * | 8/2006 | Kobayashi | G06F 8/60 709/222 |
| 2012/0072734 | A1 * | 3/2012 | Wishman | G06F 21/572 713/189 |
| 2014/0173082 | A1 * | 6/2014 | Shin | H04L 41/24 709/223 |
| 2015/0229149 | A1 * | 8/2015 | Fahlenkamp | H02J 7/0044 320/114 |
| 2015/0355875 | A1 * | 12/2015 | Matsushita | G06F 3/1236 358/1.15 |

* cited by examiner

ELECTRONIC DEVICE AND NON-TRANSITORY COMPUTER-READABLE RECORDING MEDIUM STORING CONNECTION INFORMATION MANAGEMENT PROGRAM

INCORPORATION BY REFERENCE

This application claims priority to Japanese Patent Application No. 2016-36893 filed on Feb. 29, 2016, the entire contents of which are incorporated by reference herein.

BACKGROUND

This disclosure relates to an electronic device whose firmware is updated and a computer-readable non-transitory recording medium storing a connection information management program.

Known are electronic devices whose firmware is updated through wireless communication. In the electronic devices, when a power source is turned on after tuned OFF, that is, when restarted, connection information required for a connection setup for wireless communication is used for the aforementioned connection setup.

SUMMARY

As an aspect of this disclosure, a technology obtained by further improving the technology described above will be suggested.

An electronic device according to an aspect of this disclosure includes: a wireless communication section, an FW update mode switching section, and a connection information management section.

The wireless communication section executes P2P wireless communication.

The FW update mode switching section switches a mode of the electronic device to an FW update mode in which a firmware of the electronic device is updated.

The connection information management section manages connection information required for a connection setup for the P2P wireless communication executed by the wireless communication section.

The FW update mode is a mode in which the firmware is updated through the P2P wireless communication executed by the wireless communication section.

The connection information management section keeps the connection information when a power source of the electronic device is turned on after turned off in a specific situation, and changes the connection information when the power source of the electronic device is turned on after turned off in a situation other than the specific situation, and the specific situation includes an FW update situation in which the mode of the electronic device is the FW update mode.

A non-transitory computer-readable recording medium according to an aspect of this disclosure stores a connection information management program executable by a computer in an electronic device. When the computer executes the connection information management program, the connection information management program causes the electronic device to operate as a wireless communication section, an FW update mode switching section, and a connection information management section.

The wireless communication section executes P2P wireless communication.

The FW update mode switching section switches a mode of the electronic device to an FW update mode in which a firmware of the electronic device is updated.

The connection information management section manages connection information required for a connection setup for the P2P wireless communication executed by the wireless communication section.

The connection information management program defines the FW update mode as a mode in which the firmware is updated through the P2P wireless communication executed by the wireless communication section.

Further, the connection information management program causes the electronic device to operate in a manner such that: the connection information management section keeps the connection information when a power source of the electronic device is turned on after turned off in a specific situation, and changes the connection information when the power source of the electronic device is turned on after turned off in a situation other than the specific situation; and the specific situation includes an FW update situation in which the mode of the electronic device is the FW update mode.

BRIEF DESCRIPTION OF THE DRAWINGS

FIG. 4 shows steps of operation performed by the MFP shown in FIG. 2 when a power source has been switched from OFF to ON.

DETAILED DESCRIPTION

Hereinafter, an electronic device and a computer-readable non-transitory recording medium storing a connection information management program according to an embodiment as an aspect of this disclosure will be described with reference to the drawings.

First, configuration of a firmware (FW) update system according to this embodiment will be described.

Figure 1:
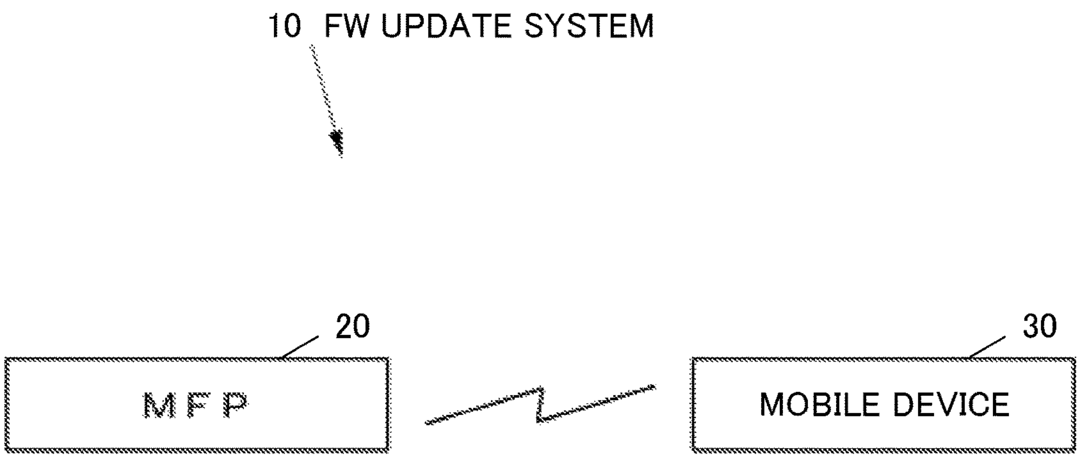
FIG. 1 shows configuration of an FW update system according to an embodiment of this disclosure.

FIG. 1 shows the configuration of the FW update system 10 according to this embodiment.

As shown in FIG. 1, the FW update system 10 includes: a multifunction peripheral (MFP) 20 as an electronic device; and a mobile device 30 such as a smartphone or a tablet.

Figure 2:
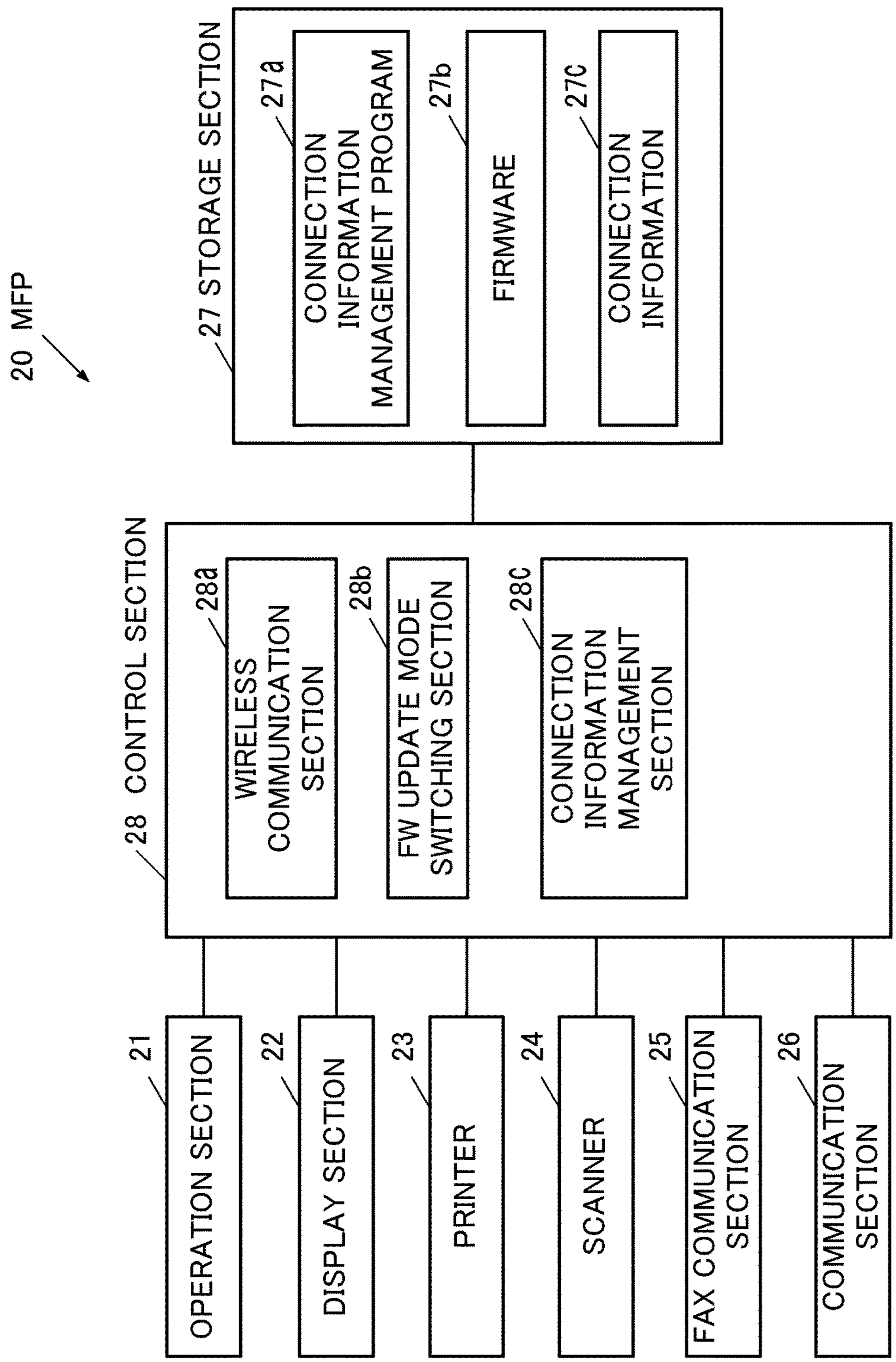
FIG. 2 shows configuration of an MFP shown in FIG. 1.

FIG. 2 shows configuration of the MFP 20.

As shown in FIG. 2, the MFP 20 includes: an operation section 21 as an input device such as buttons through which various kinds of operation performed by a user are inputted; a display section 22 as a display device such as a liquid crystal display (LCD) that displays various pieces of information; a printer 23 as a printing device that executes printing on a recording medium such as paper; a scanner 24 as a reading device that reads image data from a document; a fax communication section 25 as a fax device that performs fax communication with an external facsimile device, not shown, via a communication line such as a public phone line; a communication section 26 as a communication device that performs wire or wireless communication with an external device with going through a network or without going through the network; a storage section 27 as a non-volatile memory such as a semiconductor memory or a hard disk drive (HDD) that stores various pieces of data; and a control section 28 that controls the entire MFP 20.

The communication section 26 is capable of executing wireless communication in a peer to peer (P2P) method such as Wi-Fi Direct (registered trademark) provided by Wi-Fi Alliance.

The storage section 27 stores a connection information management program 27*a* provided for managing connection information required for a connection setup for the P2P wireless communication. The connection information management program 27*a* may be installed in the MFP 20 at a stage of production of the MFP 20, may additionally be installed in the MFP 20 from an external recording medium such as a universal serial bus (USB) memory, or may additionally be installed in the MFP 20 from the network.

The connection information required for the connection setup for the P2P wireless communication includes: for example, a service set identifier (SSID) as an identification name of an access point in Wi-Fi (registered trademark); and a security key as information used for encoding Wi-Fi communication.

The storage section 27 stores a firmware 27*b* of the MFP 20.

The storage section 27 is capable of storing connection information 27*c* required for the connection setup for the P2P wireless communication.

The control section 28 is, for example, a computer including: a central processing unit (CPU); a read only memory (ROM) that stores programs and various pieces of data; and a random access memory (RAM) as a volatile memory that is used as a working area of the CPU. The CPU executes the programs stored in the ROM or the storage section 27.

The control section 28 executes the program stored in the storage section 27 to thereby function as: a wireless communication section 28*a* that executes the P2P wireless communication; and an FW update mode switching section 28*b* that switches a mode of the MFP 20 to an FW update mode in which the firmware 27*b* is updated.

The control section 28 executes the connection information management program 27*a* stored in the storage section 27 to thereby function as a connection information management section 28*c* that manages the connection information required for the connection setup for the P2P wireless communication performed by the wireless communication section 28*a*.

Note that at least either of the wireless communication section 28*a* and the FW update mode switching section 28*b* may be realized through execution of the connection information management program 27*a* stored in the storage section 27 by the control section 28.

Figure 3:
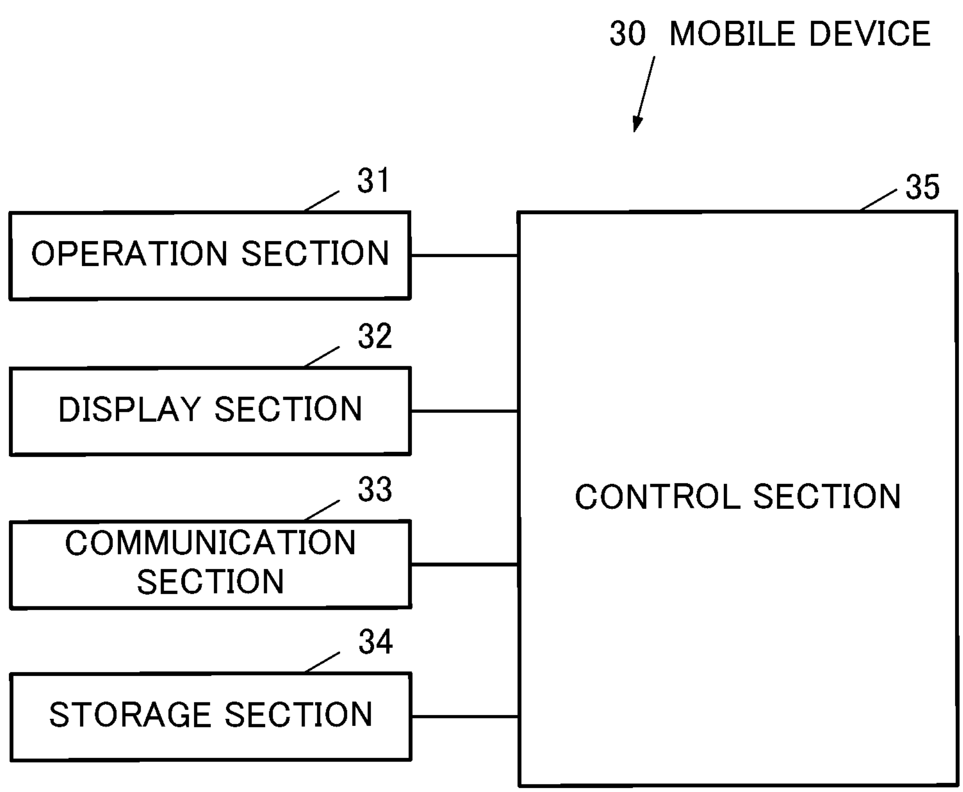
FIG. 3 shows configuration of a mobile device shown in FIG. 1.

FIG. 3 shows configuration of the mobile device 30. As shown in FIG. 3, the mobile device 30 includes: an operation section 31 as an input device such as buttons through which various kinds of operation performed by the user are inputted; a display section 32 as a display device such as an LCD that displays various pieces of information; a communication section 33 as a communication device such as Wi-Fi Direct that executes the P2P wireless communication; a storage section 34 as a storage device such as a semiconductor memory or an HDD that stores various pieces of data; and a control section 35 that controls the entire mobile device 30.

The control section 35 includes: for example, a CPU; a ROM that stores programs and various pieces of data; and a RAM that is used as a working area of the CPU. The CPU executes the programs stored in the ROM or the storage section 34.

Next, operation performed by the FW update system 10 will be described.

First, operation performed by the MFP 20 when a power source has been switched from OFF to ON will be described.

Figure 4:
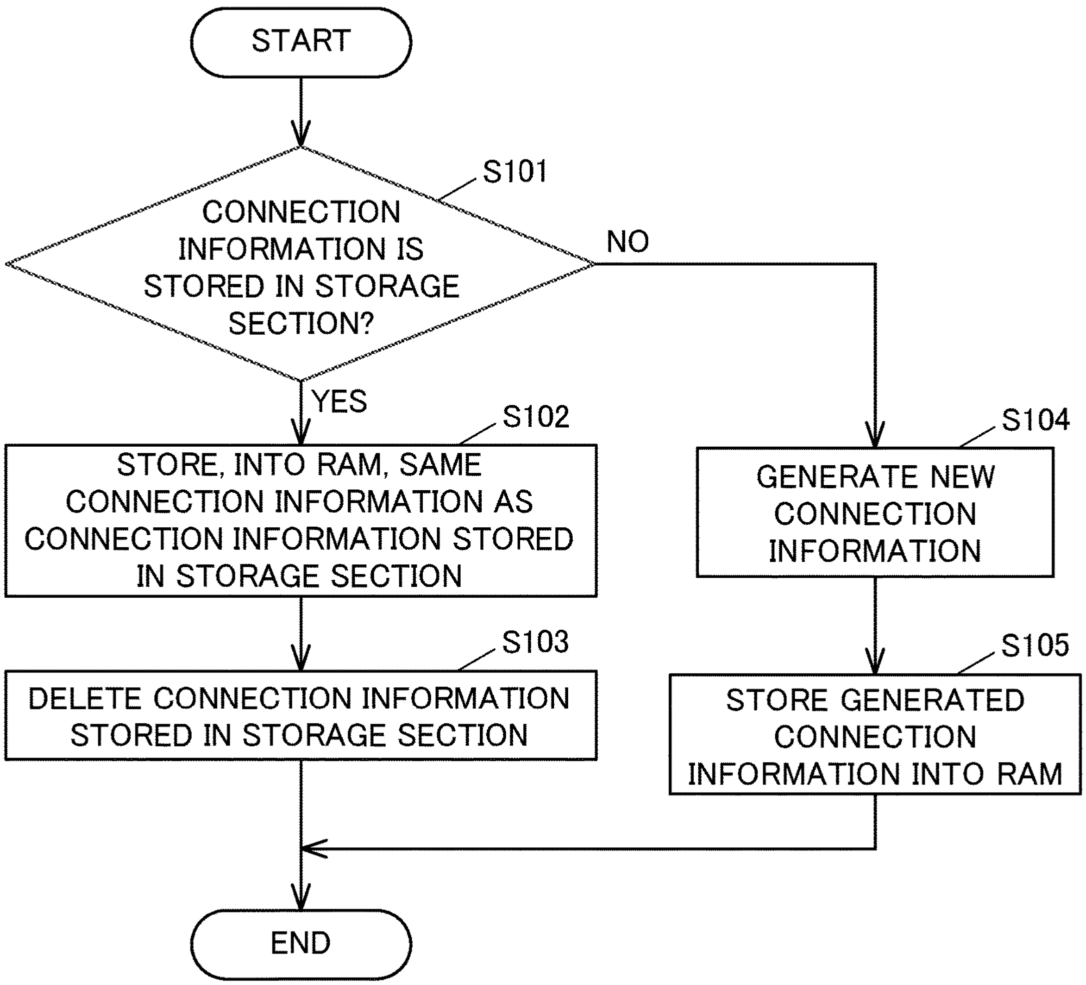

FIG. 4 shows steps of the operation performed by the MFP 20 when the power source has been switched from OFF to ON.

As shown in FIG. 4, the connection information management section 28*c* of the MFP 20 determines whether or not the connection information 27*c* is stored in the storage section 27 (S101).

Upon determination in S101 that the connection information 27*c* is stored in the storage section 27, the connection information management section 28*c* stores, into the RAM of the control section 28, the same connection information as the connection information 27*c* stored in the storage section 27 (S102), and then deletes the connection information 27*c* stored in the storage section 27 (S103), ending the operation shown in FIG. 4.

Upon determination in S101 that the connection information 27*c* is not stored in the storage section 27, the connection information management section 28*c* generates new connection information (S104), and then stores, into the RAM of the control section 28, the connection information generated in S104 (S105), ending the operation shown in FIG. 4.

Next, operation performed by the FW update system 10 to execute the connection setup for the P2P wireless communication will be described.

Figure 5:
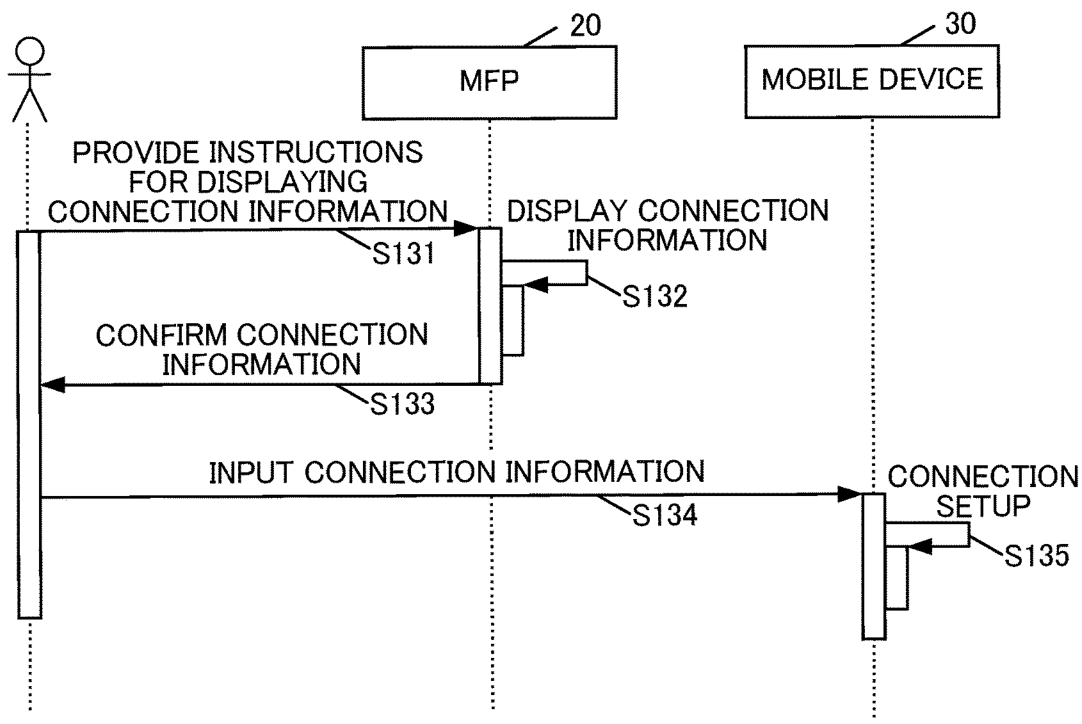
FIG. 5 shows a sequence of operation performed by the FW update system shown in FIG. 1 to execute a connection setup for P2P wireless communication.

FIG. 5 shows a sequence of the operation performed by the FW update system 10 to execute the connection setup for the P2P wireless communication.

As shown in FIG. 5, when the user has provided, to the MFP 20 via the operation section 21 of the MFP 20, instructions for displaying the connection information (S131), the connection information management section 28*c* of the MFP 20 displays, at the display section 22, the connection information provided on the RAM of the control section 28 (S132). Therefore, after confirmation of the connection information displayed at the display section 22 (S133), the user can input, into the mobile device 30 via the operation section 31 of the mobile device 30, the same connection information as the connection information displayed at the display section 22 (S134).

Upon the inputting of the connection information in S134, the control section 35 of the mobile device 30 stores the inputted connection information into the RAM or the storage section 34 of the control section 35 to thereby execute the connection setup for the P2P wireless communication (S135).

Next, operation performed by the FW update system 10 to establish connection through the P2P wireless communication will be described.

Figure 6:
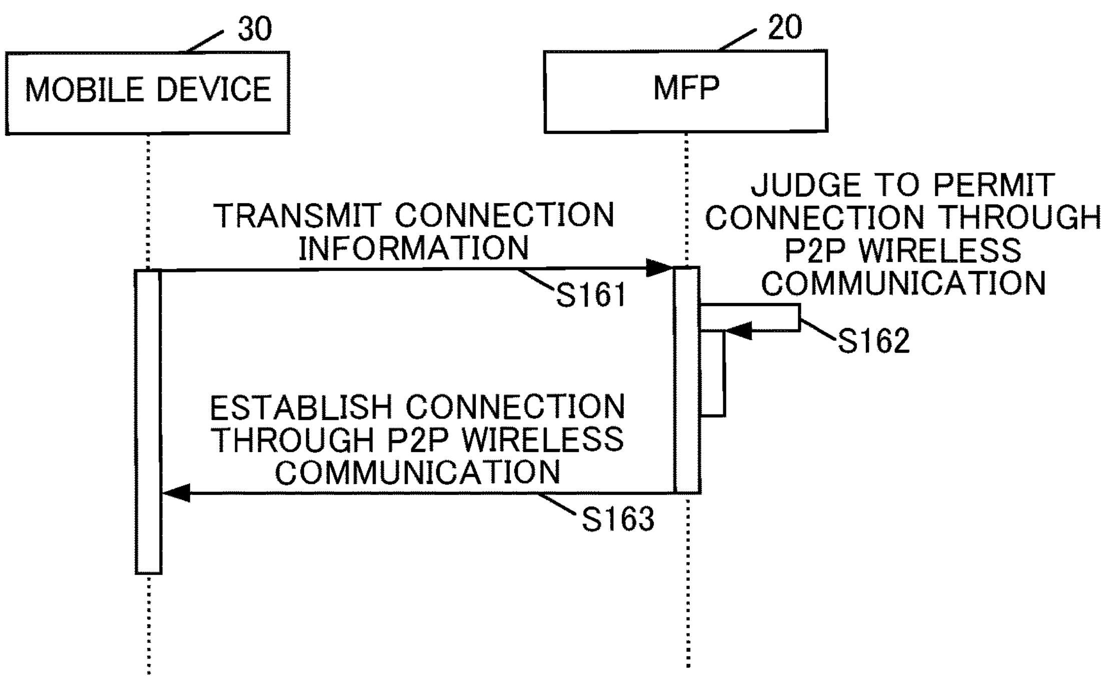
FIG. 6 shows a sequence of operation performed by the FW update system shown in FIG. 1 to establish connection through the P2P wireless communication.

FIG. 6 shows a sequence of the operation performed by the FW update system 10 to establish the connection through the P2P wireless communication.

As shown in FIG. 6, the control section 35 of the mobile device 30 wirelessly transmits, to the MFP 20 via the communication section 33, the connection setup stored in the RAM or the storage section 34 of the control section 35 (S161).

Upon the transmission of the connection setup from the mobile device 30, the wireless communication section 28*a* of the MFP 20 determinates, based on the connection setup transmitted from the mobile device 30 and a connection setup stored in the RAM of the control section 28, whether or not to permit the connection through the P2P wireless communication with the mobile device 30 (S162).

Upon determination in S162 to permit the connection through the P2P wireless communication with the mobile device 30, the wireless communication section 28*a* establishes the connection through the P2P wireless communication with the mobile device 30 (S163). On the other hand, upon determination in S162 not to permit the connection through the P2P wireless communication with the mobile device 30, the wireless communication section 28*a* does not establish the connection through the P2P wireless communication with the mobile device 30.

Next, operation performed by the MFP 20 when the firmware 27*b* is updated will be described.

Figure 7:
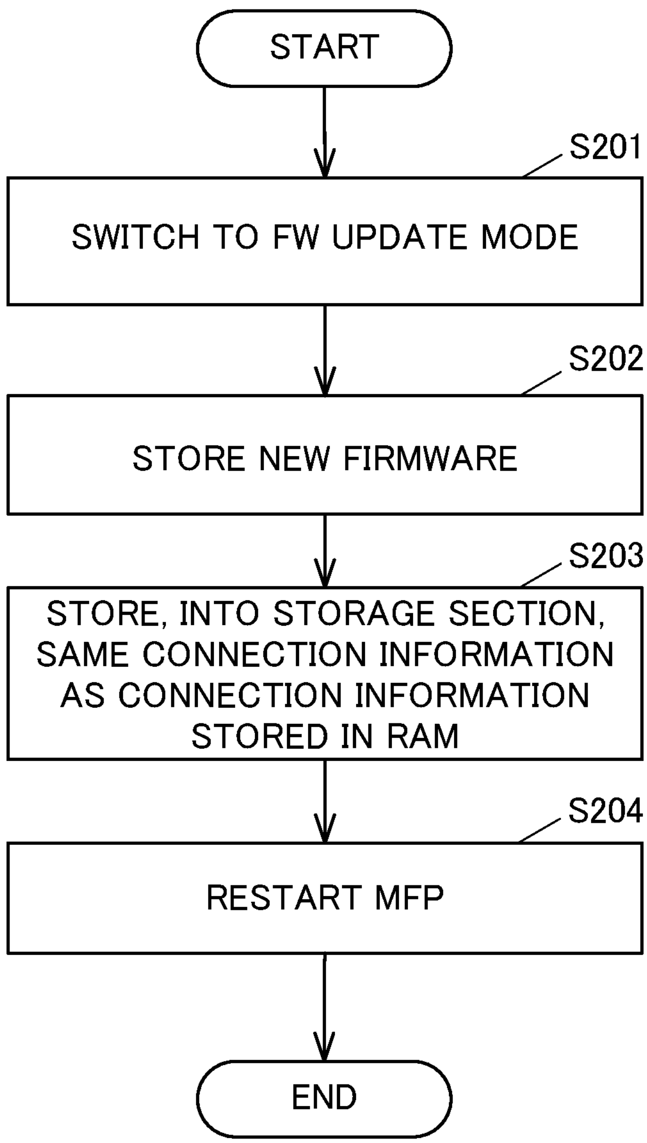
FIG. 7 shows steps of operation performed by the MFP shown in FIG. 2 when a firmware is updated.

FIG. 7 shows steps of the operation performed by the MFP 20 when the firmware 27*b* is updated.

When instructions for starting the firmware update are provided from the mobile device 30 through the P2P wireless communication with the mobile device 30 in a state in which the connection through the P2P wireless communication with the mobile device 30 is established, the control section 28 of the MFP 20 executes the operation shown in FIG. 7.

As shown in FIG. 7, the FW update mode switching section 28*b* of the MFP 20 switches the mode of the electronic device from a normal mode to the FW update mode (S201).

Next, the control section 28 overwrites the current firmware 27*b* on the storage section 27 by providing, as a new firmware 27*b*, the firmware transmitted from the mobile device 30 through the P2P wireless communication (S202). That is, the firmware 27*b* is updated.

Next, the connection information management section 28*c* stores, as the connection information 27*c* into the storage section 27, the same connection information as the connection information stored in the RAM of the control section 28 (S203).

Next, the control section 28 restarts the MFP 20 (S204). That is, the power source of the MFP 20 is turned on after turned off.

In the above, after overwriting the firmware 27*b* (S202), the control section 28 stores the connection information 27*c* into the storage section 27 (S203). However, even without executing the storage of the connection information 27*c* into the storage section 27 after the overwriting of the firmware 27*b*, the control section 28 may execute the storage of the connection information 27*c* into the storage section 27 before turning off the power source of the MFP 20 after the instructions for starting the firmware update are provided from the mobile device 30. That is, the control section 28 may execute the storage of the connection information 27*c* into the storage section 27 before the processing of S202.

As described above, when restarted in a situation in the normal mode, that is, when restarted at normal time, the MFP 20 changes the connection information (NO in S101, S104 and S105), so that upon accidental leakage of the connection information, unauthorized access based on the leaked connection information can be prevented, which permits an improvement in security performance at normal time.

Moreover, the MFP 20 keeps the connection information (S203, YES in S101 and S102) when restarted upon the update of the firmware 27*b* (S204), so that a connection setup for wireless communication with the MFP 20 does not have to be executed with the new connection information after the restart of the MFP 20 in the mobile device 30 for wirelessly confirming whether or not the update of the firmware 27*b* has succeeded (see FIG. 5), which permits an improvement in convenience upon the update of the firmware 27*b*. The connection information stored in the storage section 27 is deleted after S102 (S103). Specifically, only upon the restart at time of the update of the firmware 27*b*, the connection information before the restart is kept. Therefore, after the update of the firmware 27*b*, upon a simple restart, that is the restart other than the time of the update of the firmware 27*b*, the connection information is changed (NO in S101, S104 and S105), which permits an improvement in the security performance after the update of the firmware 27*b*. The aforesaid "after the update of the firmware 27*b*" is one example of "specific situation" described in CLAIMS.

For example, in a case where a service person of the MFP 20 uses his or her own mobile device 30 to update the firmware 27*b* of the MFP 20, since the service person usually does not belong to an organization using the MFP 20, the mobile device 30 cannot be connected to a network of the organization using the MFP 20 for a security reason in many cases even when the MFP 20 is connected to the network of the aforementioned organization. Thus, the service person directly connects the mobile device 30 to the MFP 20 through the P2P wireless communication to thereby update the firmware 27*b* of the MFP 20. Here, in a case where the organization using the MFP 20 has, in addition to the MFP 20, a plurality of MFPs that require the firmware update, the service person can remain in a specific place located little distant from each of the plurality of MFPs and execute firmware update on each of the plurality of MFPs via the mobile device 30 and can execute, via the mobile device 30, confirmation whether or not the firmware update has succeeded.

Since the MFP 20 keeps the connection information when restarted upon the update of the firmware 27*b* through the P2P wireless communication in a state in which the connection through the P2P wireless communication is established, the convenience upon the update of the firmware 27*b* can appropriately be improved. However, the MFP 20 may keep the connection information not only when restarted upon the update of the firmware 27*b* through the P2P wireless communication in the state in which the connection through the P2P wireless communication is established but also when restarted upon the update of the firmware 27*b* in the state in which the connection through the P2P wireless communication is established. Further, the MFP 20 may keep the connection information not only when restarted upon the update of the firmware 27*b* in the state in which the connection through the P2P wireless communication is established but also when restarted upon the update of the firmware 27*b*.

Moreover, as long as the power source is turned on after turned off in a specific situation, the MFP 20 may also keep the connection information when the power source is turned on after turned off in a situation other than an FW update situation that is in the FW update mode.

Upon the update of the firmware 27*b*, the MFP 20 automatically executes restart (S204), but may execute the restart based on instructions provided via the operation section 21 or the mobile device 30.

Here, a typical electronic device will be described. It is unclear whether connection information required for a connection setup for wireless communication is kept or changed when a power source is turned on after turned off in the typical electronic device, that is, when the electronic device is restarted.

With configuration of the electronic device such that the connection information is kept upon restart, upon leakage of the connection information, even when the electronic device is restarted, there is a possibility of unauthorized access based on the leaked connection information, thus raising a security problem.

On the other hand, with configuration of the electronic device such that the connection information is changed upon restart, when the electronic device is restarted as a result of the firmware update, even when wireless communication with the electronic device is properly executed before the restart of the electronic device in another device provided for confirming, through wireless communication, whether or not the firmware update has succeeded, a connection setup for wireless communication with the electronic device needs to be executed with new connection information after the restart of the electronic device. Therefore, there arises a problem with the convenience upon the firmware update.

On the contrary, with the aforementioned embodiment, as described above, the security performance at normal time and the convenience upon the firmware update can be improved.

The electronic device of this disclosure is an MFP in this embodiment, but may be an image forming apparatus such as a print-only device, a copy-only device, or a fax-only device, or an electronic device, such as a personal computer (PC), other than an image forming apparatus.

While the present disclosure has been described in detail with reference to the embodiments thereof, it would be apparent to those skilled in the art the various changes and modifications may be made therein within the scope defined by the appended claims.

What is claimed is:

1. An electronic device comprising:

a wireless communication section executing P2P wireless communication;

an FW update mode switching section switching a mode of the electronic device to an FW update mode in which a firmware of the electronic device is updated;

a connection information management section managing connection information required for a connection setup for the P2P wireless communication executed by the wireless communication section;

a non-volatile memory capable of storing the connection information; and a volatile memory capable of storing the connection information, wherein the FW update mode is a mode in which the firmware is updated through the P2P wireless communication executed by the wireless communication section, the connection information management section:

when a power source of the electronic device is turned on after turned off in a first situation where the connection information is not stored in the non-volatile memory, generates the connection information and store the connection information into the volatile memory;

after the FW update mode switching section has switched the mode of the electronic device to the FW update mode, stores the connection information stored in the volatile memory into the non-volatile memory; and when, after the update of the firmware, the power source of the electronic device is turned on after turned off in a second situation where the connection information has already been stored in the non-volatile memory, stores the connection information stored in the non-volatile memory into the volatile memory, and then deletes the connection information from the non-volatile memory, and the second situation includes an FW update situation in which the mode of the electronic device is the FW update mode.

2. The electronic device according to claim 1, wherein the FW update situation is a situation in which the mode of the electronic device is the FW update mode in a state in which the wireless communication section establishes the connection through the P2P wireless communication.

3. The electronic device according to claim 1, wherein the FW update situation is a situation in which the mode of the electronic device is the FW update mode in which the firmware is updated through the P2P wireless communication executed by the wireless communication section.

4. A non-transitory computer-readable recording medium storing a connection information management program executable by a computer in an electronic device, wherein when the computer executes the connection information management program, the connection information management program causes the electronic device to operate as:

a wireless communication section executing P2P wireless communication;

an FW update mode switching section switching a mode of the electronic device to an FW update mode in which a firmware of the electronic device is updated;

a connection information management section managing connection information required for a connection setup for the P2P wireless communication executed by the wireless communication section;

a non-volatile memory capable of storing the connection information; and a volatile memory capable of storing the connection information, wherein the connection information management program defines the FW update mode as a mode in which the firmware is updated through the P2P wireless communication executed by the wireless communication section, the connection information management program further causes the electronic device to operate in a manner such that the connection information management section:

when a power source of the electronic device is turned on after turned off in a first situation where the connection information is not stored in the non-volatile memory, generates the connection information and store the connection information into the volatile memory;

after the FW update mode switching section has switched the mode of the electronic device to the FW update mode, stores the connection information stored in the volatile memory into the non-volatile memory; and when, after the update of the firmware, the power source of the electronic device is turned on after turned off in a second situation where the connection information has already been stored in the non-volatile memory, stores the connection information stored in the non-volatile memory into the volatile memory, and then deletes the connection information from the non-volatile memory, and the second situation includes an FW update situation in which the mode of the electronic device is the FW update mode.

* * * * *